Patented Oct. 25, 1949

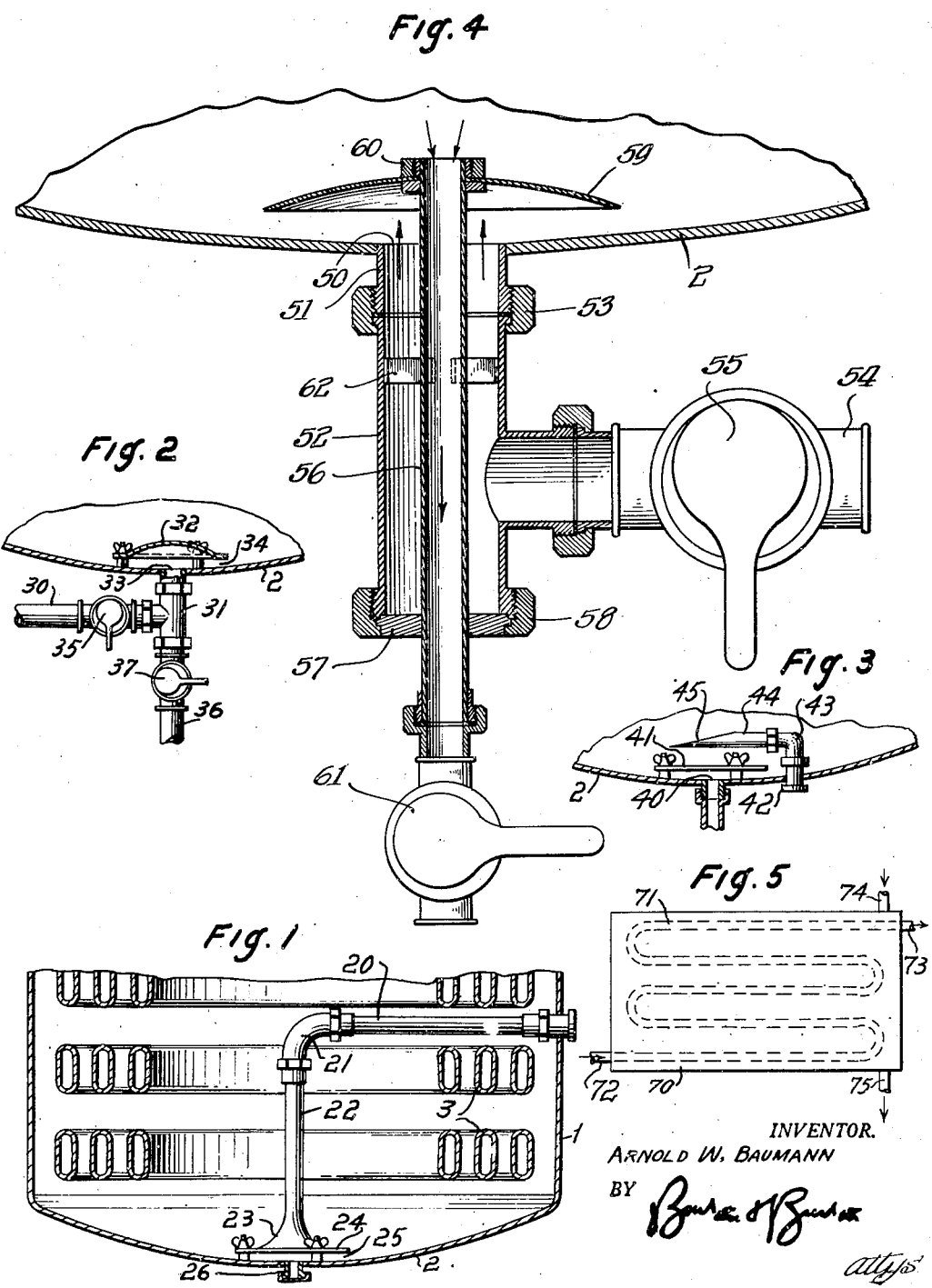

2,485,689

UNITED STATES PATENT OFFICE 2,485,689

MILK EVAPORATOR

Arnold W. Baumann, Chicago, Ill.

Application October 18, 1943, Serial No. 506,680

6 Claims. (Cl. 159—23)

This invention relates to evaporating pans of the type employed for evaporating and condensing milk, and it is concerned particularly with the means by which the milk is introduced into the heating chamber of the vacuum pan.

One object of the invention is to provide a construction by which the introduction of the milk may serve to increase the circulation of the liquid in the chamber over the heating surfaces therein for increasing the evaporating capacity of the unit.

Another object of the invention is to provide an inlet for the milk in an evaporating pan so located as to create a circulation in the thickened milk lying over the bottom of the pan, resulting in a more uniform density of the product in the evaporator.

A further object of the invention is to provide an evaporating pan with an inlet for milk in the lower portion thereof and adjacent the lowest coils of the heating element.

More specifically, it is an object of the invention to provide means for introducing the milk through the bottom of the heating chamber of an evaporating pan and in a direction to produce movement of the milk upwardly and directly toward the heating coils. This may be accomplished by various constructions, several of which are illustrated and described herein.

The objects and advantages of the invention will be more fully understood upon consideration of the following description taken in connection with the drawings in which:

Fig. 1 is a fragmentary vertical section of the lower portion of an evaporating pan, including part of some of the steam coils by which the milk is heated therein, and showing one arrangement of inlet nozzle for the milk, embodying the present invention.

Fig. 2 is a fragmentary vertical section of the bottom of the evaporating pan with a modified form of milk inlet applied thereto, and including an outlet as a part of the structure.

Fig. 3 is a fragmentary section similar to Fig. 2, but showing a further modification.

Fig. 4 is a vertical sectional view of an additional modification in which the inlet and outlet are combined in a fitting designed for application to existing structures.

Fig. 5 is a diagrammatic side elevation, on a reduced scale, of a conventional form of milk preheater for preheating the milk to be passed into the milk inlet of the evaporator.

While there is shown and described herein certain specific structure embodying the invention, it will be manifest to those skilled in the art that various modifications and re-arrangements of the parts may be made without departing from the scope of the invention, and that the same is not limited to the particular form herein shown and described, except in so far as indicated by the appended claims.

In the evaporation and condensation of milk, for precipitating the mineral salts, expanding the protein, and for controlling the stability and body of the condensed milk products, it is customary practice to pre-heat the raw, skimmed or whole milk to a temperature varying from 180° F. to 210° F. before it is introduced into the vacuum pan. The average boiling temperature in the pan, corresponding to a reduced pressure of 25¼ inches of mercury (below atmosphere), is about 130° F. The milk entering at a temperature of about 200° F. thus evaporates its moisture content until its temperature has been lowered to 130° F.

Thus, for each 100 pounds of milk preheated to 200° F., and flashed into a vacuum pan at reduced pressure corresponding to a boiling point of 130° F., approximately 70 B. t. u.'s per pound, or 7,000 B. t. u.'s for 100 pounds of milk will be available for evaporation. It requires approximately 1020 B. t. u.'s to evaporate one pound of water at 130° F.; therefore, the temperature drop from 200° F. to 130° F. will evaporate approximately 6.8 pounds of water from the milk.

At the present time, there are several arrangements employed for introducing the incoming milk into the evaporator. Usually, the fluid inlet is located above the boiling level, permitting the milk to flash down to its saturation temperature before it comes in contact with the boiling fluid. Such an arrangement, however, tends to invite considerable loss by way of entrainment, because the violently boiling milk at the surface of the liquid in the heating chamber tends to pick up solids from the incoming milk and carry them upward to the outlet. Other arrangements inject the fluid downwardly near the coils, or in the center of the pan, with the end of the inlet pipe well submerged, but this system often retards the natural circulation of the boiling movement.

The present invention provides means for introducing the incoming hot milk through the bottom of the chamber of the evaporator which contains the steam coil, and for discharging the milk radially in a more or less horizontal direction, but also upwardly to a slight degree, so as to increase the rapidity of circulation of the entire volume of liquid over the heating surfaces of the coils. This is of special advantage in the vicinity of the lower coils, where the circulation is normally rather sluggish, partly because with the coil type of evaporator there is always a dead space between the dished bottom of the shell and the lowest coil of the heater, and partly because the condensed product which accumulates in the lower portion of the shell has a high percentage of solid content, and is therefore thicker and more sluggish in its action than the liquid in the upper portion of the shell.

The "superheated" milk leaving the discharge nozzles or outlets at high velocity causes a part of its water content to flash almost immediately into vapor, which greatly expands its volume. This action produces definite circulation in the milk adjacent the bottom of the pan and tends to result in a more uniform density of the product throughout the evaporating chamber.

Fig. 1 illustrates the lower portion of a typical evaporating pan, which includes a cylindrical shell 1 having a downwardly bulged or dished bottom wall 2 and containing steam coils 3 of annular form, so that the central portion of the shell 1 adjacent its axis is substantially unobstructed by the coils. The steam enters each coil at one side of the shell and is discharged at the opposite side of the shell, it being understood that the inlets and outlets are connected by suitable conduits, not shown.

In Fig. 1 there is an inlet pipe 20 leading through the side of the shell 1, and connected by an elbow 21 with a downwardly extending vertical tube 22, which terminates in a flared outlet 23 with a horizontal deflector flange 24. Thus, the hot milk entering by way of this tube 22 is discharged outwardly from the center of the chamber through the annular outlet space 25 between the edge of the flange 24 and the bottom wall 2 of the evaporating pan, and the curved formation of the bottom wall will give an upward trend to the flow of incoming milk, directing it toward the heating coils in the pan. An outlet for the finished batch of condensed milk is shown at 26, directly below the flared inlet 23, this outlet being normally closed during the introduction of milk by way of the inlet tube 22.

Fig. 2 shows a modified construction in which the milk inlet pipe 30 leads to a T-fitting 31, discharging upwardly through the bottom wall 2 of the evaporator pan at the center thereof. A deflector plate 32 is mounted over the inlet opening 33 in spaced relation to the bottom wall 2, so as to provide an annular discharge opening 34 for the incoming milk. A valve 35 controls the inlet pipe 30. The outlet pipe 36, connected to the T-fitting 31, has a control valve 37, so that the same opening 33 may serve for releasing the finished batch of condensed milk from the chamber.

Fig. 3 shows another alternative arrangement, which includes an inlet opening 40 for the milk at the center of the bottom wall 2 of the evaporator, and which provides a circular disk or baffle plate 41 spaced above the opening 40. A separate outlet 42 extends through the bottom wall at one side of the central axis, and connects with an elbow 43 and with a horizontally disposed receiving section 44 of tubular form, which extends directly over the baffle disk 41 and which is cut off obliquely to form an elongated, upwardly open mouth at 45. This arrangement may be employed with continuous operation, since the finished product will tend to accumulate at the central portion of the chamber near the outlet mouth 45, while incoming milk will be directed outwardly toward the side walls of the chamber and upwardly therein for contact with the annular heating coils.

With any of the structures herein shown and described it will be found that as the flash vapor from the hot milk pierces through the colder milk in the pan, it will gradually condense in giving off its heat to the surrounding body of milk, and that this action will tend to produce a generally radial motion, bringing the heated milk underneath the coils, and accelerating upward movement through the coils as the result of the increased buoyancy of the liquid. Increasing the rapidity of circulation over the coils results in an increase in evaporation capacity. The high velocity of the incoming milk, which results from its flashing into vapor, is thus effectively put to work as a circulation agent, whereas in the former constructions, in which the hot milk was introduced above the level of liquid in the evaporator, this high velocity of the flashing vapors was considered a handicap because of its tendency to entrain some of the solids and carry them off with the vapors by way of the vapor outlet.

In many cases it may be desirable to alter an existing evaporator to secure the advantages of this invention, and for that purpose the arrangement shown in Fig. 4 may be employed. The bottom wall 2 will usually have a central opening 50 with a threaded section of pipe or tubing 51 extending downwardly therefrom. A T-fitting 52 is connected by a coupling 53 to the threaded member 51, and the stem of the T-fitting is coupled to the milk inlet passage 54 which is shown as including a control valve 55. An outlet pipe 56 of smaller diameter than the T-fitting extends through the latter, being supported at the lower end by a disk 57 which is welded or otherwise permanently attached to the pipe 56 and clamped into the lower arm of the T-fitting by means of a gland or nut 58. At the upper end, the pipe 56 supports a deflector 59 secured to the pipe by a sanitary type lock nut 60. At the lower end the pipe 56 is coupled to a milk outlet passage including a valve 61. This arrangement permits removal of the deflector 59 upon release of the nut 60, so that the pipe 56 can be wholly withdrawn from the T-fitting 52 for cleaning purposes. Preferably, the pipe 56 is steadied and centered within the T-fitting by three brace members 62 set edgewise to the flow, as seen in Fig. 4. This arrangement, providing separate passages for inflow and outflow, is adapted for use with continuous operation of the vacuum pan.

For preheating the milk to a temperature above the boiling point which obtains within the evaporator, any suitable means may be employed. To this end I have illustrated on a small scale in Fig. 5 a conventional form of preheater comprising a closed tank 70 within which is mounted a pipe 71 which may be coiled or otherwise bent back and forth therein, and which pipe is at one end extended out of the tank to form an inlet 72 connected to any suitable source of milk supply. The other end of the pipe is extended out of the tank to form an outlet 73 to be connected by piping to the milk inlet 54 of Fig. 4 for entry into the evaporator. Steam, or other hot fluid is introduced into tank 70 at inlet 74 to pass around the outside of pipe 71 to heat the milk therein, said steam and any condensation thereof passing out of the tank at the outlet 75. If desired a plurality of pipes 71 may be used, each surrounded by steam within the tank 70.

I claim as my invention:

1. In a milk evaporator which includes a shell with a heating coil in the lower portion thereof, said shell having an upwardly concave bottom wall, a baffle plate disposed below the position of the coil and over the central area of said bottom wall within the shell in spaced relation to said bottom, said bottom wall having an opening under the baffle plate with an inlet conduit connected to said opening and adapted for connection to a milk supply source, and an outlet pipe disposed with its opening directly above said baffle.

2. In a milk evaporator which includes a shell with a heating coil in the lower portion thereof, said shell having an inlet opening for the milk in the bottom of the shell and adjacent its central axis with means directing the inflow away from said axis comprising a baffle plate spaced above said opening, a pipe connected to said inlet opening and adapted for connection to a milk supply source, and an outlet pipe supported within said pipe and extending through said opening and upwardly through the baffle with its receiving mouth within the shell just above the baffle.

3. In a milk evaporator which includes a shell with a heating coil in the lower portion thereof, the bottom wall of the shell having an inlet opening, a T-fitting disposed below the shell with one arm connected into said opening, a closure for the other arm and an outlet pipe supported in said closure and extending through it and through both arms of said T-fitting, into the shell, an inlet conduit for milk connected to the laterally extending stem of said T-fitting, and a baffle disk within the shell supported on the upper end of the outlet pipe, in spaced relation to its bottom wall and overlying the inlet opening to direct the inflow radially within said shell.

4. In the combination defined in claim 3, means removably securing the baffle disk to the outlet pipe and means removably securing said closure to the T-fitting to permit withdrawal of the outlet pipe therefrom at will.

5. In a milk evaporator, a cylindrical shell having a concave bottom and a side wall, a series of annular steam coils within the shell and extending adjacent the side wall in the lower portion thereof, said series of coils having a vertically extending central open space passing therethrough, a baffle plate within the shell and spaced a slight distance from the concave bottom thereof, a feed pipe having an outlet discharging into the space between the baffle plate and the bottom wall of the shell, said baffle plate being located below the central opening in said series of coils whereby to direct the inflow of milk radially outwardly and upwardly directly between and around said coils, and outlet means in the bottom of the shell coaxial with the discharge end of the feed pipe.

6. In a milk evaporator which includes a shell with a heating coil in the lower portion thereof, said shell having an upwardly concave bottom wall, a baffle plate disposed below the position of the coil and over the central area of said bottom wall within the shell in spaced relation to the bottom wall, said bottom wall having an opening under the baffle plate, a two-pipe conduit member connected to said opening, one pipe of said member serving as an inlet for milk and the other pipe serving as an outlet, and valve means controlling said pipes.

ARNOLD W. BAUMANN.

REFERENCES CITED

The following references are of record in the file of this patent:

UNITED STATES PATENTS

| Number | Name | Date |
|---|---|---|
| 242,216 | Morrell | May 31, 1881 |
| 368,881 | Duncan | Aug. 23, 1887 |
| 875,405 | Barse | Dec. 31, 1907 |
| 879,515 | Campbell | Feb. 18, 1908 |
| 1,042,912 | Hay | Oct. 29, 1912 |
| 2,207,057 | Gulick | July 9, 1940 |
| 2,291,228 | Jensen | July 28, 1942 |